(12) United States Patent
Shamee

(10) Patent No.: US 6,359,583 B1
(45) Date of Patent: Mar. 19, 2002

(54) GROUND BASED MILLIMETER WAVE IMAGING SYSTEM

(75) Inventor: Bishara F. Shamee, Playa Del Rey, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/466,372

(22) Filed: Dec. 16, 1999

(51) Int. Cl.⁷ .............................................. G01S 13/91
(52) U.S. Cl. ............................ 342/33; 342/34; 342/35; 342/36; 342/37; 342/38; 342/55; 342/58
(58) Field of Search ............................ 342/29, 33, 34, 342/35, 36, 37, 38, 52, 55, 58

(56) References Cited

U.S. PATENT DOCUMENTS

| | | |
|---|---|---|
| 4,940,986 A | 7/1990 | Huguenin .................... 342/410 |
| 5,455,587 A | 10/1995 | Schneider ..................... 342/62 |
| 5,483,241 A | 1/1996 | Waineo et al. ................. 342/29 |
| 5,661,486 A | 8/1997 | Faivre et al. .................. 342/33 |
| 5,831,570 A * | 11/1998 | Ammar et al. ................. 342/26 |
| 6,119,055 A * | 9/2000 | Richman ...................... 701/16 |
| 6,211,809 B1 * | 4/2001 | Stiles ........................... 342/33 |

* cited by examiner

*Primary Examiner*—John B. Sotomayor
(74) *Attorney, Agent, or Firm*—Antonelli, Terry, Stout & Kraus, LLP

(57) ABSTRACT

System and methods for a ground based millimeter wave imaging system that provides real-time millimeter wave images of an airport to one or more aircraft from one or more ground stations (18). The system includes at least one millimeter wave transceiver (19) that is located in each one or more ground stations. Each at least one millimeter wave transceiver collects real-time millimeter wave images of the airport. At least one image processor (21) is operatively connected to the at least one millimeter wave transceiver, and processes the real-time millimeter wave images of the airport. At least one data link (22) allows communication of information between the one or more aircraft and the one or more ground station. The one or more ground stations transmit the processed realtime millimeter wave images to the one or more aircraft using the at least one link.

16 Claims, 3 Drawing Sheets

GROUND BASED MILLIMETER WAVE IMAGING SYSTEM

BACKGROUND OF THE INVENTION

1. Field of the Invention

This invention relates to millimeter wave imaging systems, and more specifically to ground based millimeter wave imaging systems.

2. Backpround and Material Information

Millimeter wave imaging systems are used to aid aircraft in landing during poor visibility conditions (e.g., fog, rain . . .). Current millimeter wave imaging systems used for landing aircraft generally employ an active transceiver and a corresponding image processor that are both located in the aircraft. The image processor converts the millimeter wave signals to millimeter wave images of the landing site to assist the pilot in landing the aircraft.

FIG. 1 shows a diagram of a conventional airborne millimeter wave imaging system. The aircraft 2 follows a flight path 16 towards runway 10. In the nose of the aircraft is a millimeter wave imaging system that includes a transceiver 4 and image processor 6. Transceiver 4 transmits millimeter wave radar signals that obtain images of the airport. The return signals, with a field of view 8, are processed by image processor 6. Image processor 6 is operationally connected to transceiver 4, and forms an image of runway 10 and taxiway 12 from the received signals. This image is provided to the pilot to aid in landing the aircraft in poor visibility conditions.

An important metric of a millimeter wave imaging system is its image quality. Generally, transceivers that exist onboard aircraft are heavy, bulky, and do not have the capability to perform the sophisticated processing that is required to enhance the image quality and improve the contrast of the landing site image viewed by the pilot. The transceiver is normally mounted in the nose of the aircraft in conjunction with other aircraft instruments. Therefore, retrofitting an aircraft to accommodate the transceiver volume can be difficult.

Further, many airborne millimeter wave imaging systems may have low signal-to-noise ratios further adding to decreased image quality. The signal-to-noise ratio may be improved if the time to capture the landing site image (dwell time) is increased. However, in airborne millimeter wave imaging systems, the aircraft has only a small amount of time to gather the image, process the image, and present it to the pilot so that the processed image can be used to aid in landing the aircraft.

In most aircraft, the weight of instruments and other items that are on board during flight is always a concern. The heavy, bulky transceivers and corresponding imaging processor that currently exist in airborne millimeter wave imaging systems add weight to the aircraft. Moreover, the addition of an airborne transceiver and associated imaging processor increase the overall cost of the aircraft.

In conventional airborne millimeter wave imaging systems, if the transceiver or the imaging processor develops a problem, or for some reason do not operate properly, the pilot will be without the aid of an imaging system. Due to space and size restrictions on the aircraft, there is usually no room to have a backup millimeter wave imaging system on the aircraft that can be used if the primary imaging system fails. Therefore, most conventional airborne millimeter wave imaging systems are limited in their ability to provide images to a pilot during faulty conditions in the airborne millimeter wave imaging system. Further, the addition of a backup millimeter wave imaging system on board the aircraft, if possible, further increases the cost of the aircraft.

SUMMARY OF THE INVENTION

Accordingly, the present invention is directed to a ground based millimeter wave imaging system that substantially obviates one or more of the problems arising from the limitations and disadvantages of the related art.

It is an object of the present invention to provide a ground based millimeter wave imaging system that provides increased image quality in the form of high contrast and high resolution.

It is a further object of the present invention to provide a ground based millimeter wave imaging system that increases the capability to perform sophisticated image processing algorithms.

Another object of the present invention is to provide a ground based millimeter wave imaging system that provides improved reliability of the overall landing system.

Still another object of the present invention is provide a ground based millimeter wave imaging system that reduces the weight, volume, and cost of a flight unit.

Accordingly, one aspect of the present invention is directed to a ground based millimeter wave imaging system that provides real-time millimeter wave images of an airport to one or more aircraft from one or more ground stations. The system includes at least one millimeter wave transceiver that is located in each, one or more, ground stations. Each, millimeter wave transceiver collects real-time millimeter wave images of the airport. At least one image processor is operatively connected to the millimeter wave transceiver and located in each ground station, and processes the real-time millimeter wave images of the airport. At least one data link allows communication of information between the one or more aircraft and the one or more ground stations. The ground stations transmit the processed real-time millimeter wave images to the aircraft using the data link.

According to another aspect of the present invention, the real-time millimeter wave images of the airport includes runways and taxiways at the airport.

According to yet another aspect of the present invention, the one or more ground stations obtain location and attitude information of at least one aircraft.

In a further aspect of the present invention, the location information of the one or more aircraft is obtained simultaneously with the collection of real-time millimeter wave images of the airport.

According to another aspect of the present invention, the ground stations obtain location information and attitude of one or more aircraft from the aircraft.

According to yet another aspect of the present invention, one or more ground stations obtain location information and attitude of one or more aircraft using a ranging radar located in one or more ground stations.

In a further aspect of the present invention, the location information includes coordinates and attitude of the one or more aircraft.

According to another aspect of the present invention, the data link may be a high-speed full duplex data link.

According to yet another aspect of the present invention, one or more ground stations converts the processed millimeter wave images of the airport to a format suitable for viewing by pilots of one or more aircraft.

In a further aspect of the present invention, each ground station communicates information about the millimeter wave images of the airport to each other.

Another aspect of the present invention is directed to a method for providing real-time millimeter wave images of an airport to at least one aircraft to aid in landing and taxiing of the aircraft. Real-time millimeter wave images are collected of the airport by at least one ground station. Location and attitude information may be acquired for at least one aircraft. The millimeter wave images are processed where the processing occurs in at least one ground station. The processed millimeter wave images are in a format for viewing by a pilot of at least one aircraft. The processed millimeter wave images are transmitted to at least one aircraft.

According to yet another aspect of the present invention, the real-time millimeter wave images include images of runways and taxiways of the airport.

In a further aspect of the present invention, the location information includes coordinates and attitude of at least one aircraft.

According to another aspect of the present invention, each ground station communicates information about the airport to each other.

In a further aspect of the present invention, the location information for the at least one aircraft is acquired simultaneously with the collecting of real-time millimeter wave images of the airport.

According to another aspect of the present invention, the location information and attitude for the at least one aircraft is acquired from the aircraft.

According to yet another aspect of the present invention, the location information and attitude for at least one aircraft is acquired using a ranging radar located in at least one ground station.

In a further aspect of the present invention, the processed millimeter wave images are transmitted to at least one aircraft using a high speed full duplex data link.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows in reference to the noted plurality of drawings by way of non-limiting examples of preferred embodiments of the present invention in which like reference numerals represent similar parts throughout the several views of the drawings and wherein.

DETAILED DESCRIPTION OF THE PREFERRED EMBODIMENTS

The particulars shown herein are by way of example and for purposes of illustrative discussion of the embodiments of the present invention only and are presented with the cause of providing a useful and readily understood description of the principles and conceptual aspects of the present invention. In this regard, no attempt is made to show structural details of the present invention in more detail than is necessary for the fundamental understanding of the present invention. The description taken with the drawings make it apparent to those skilled in the art how the several forms of the present invention may be embodied in practice.

Figure 1:
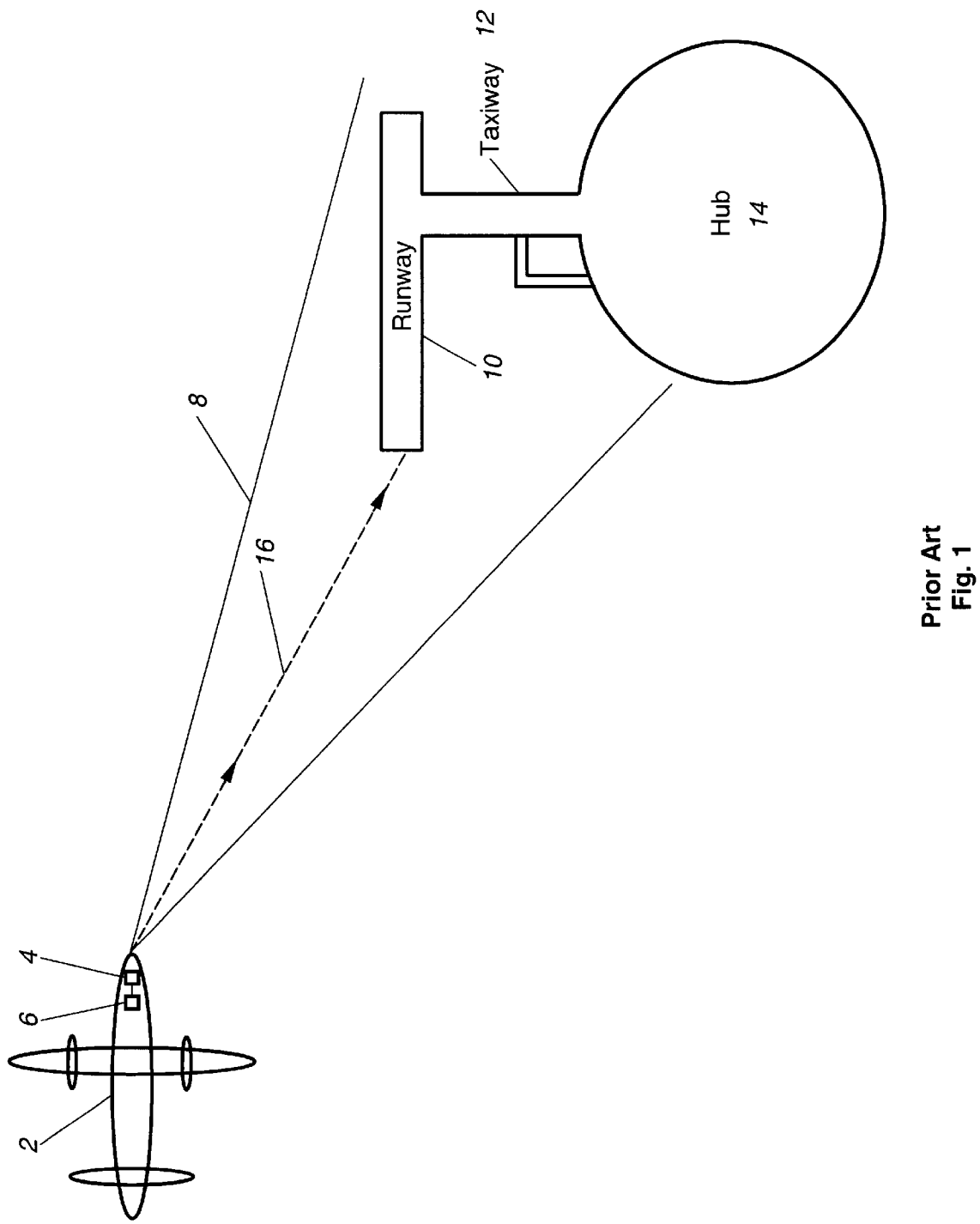
FIG. 1 is a diagram of a conventional airborne millimeter wave imaging system.
Figure 2:
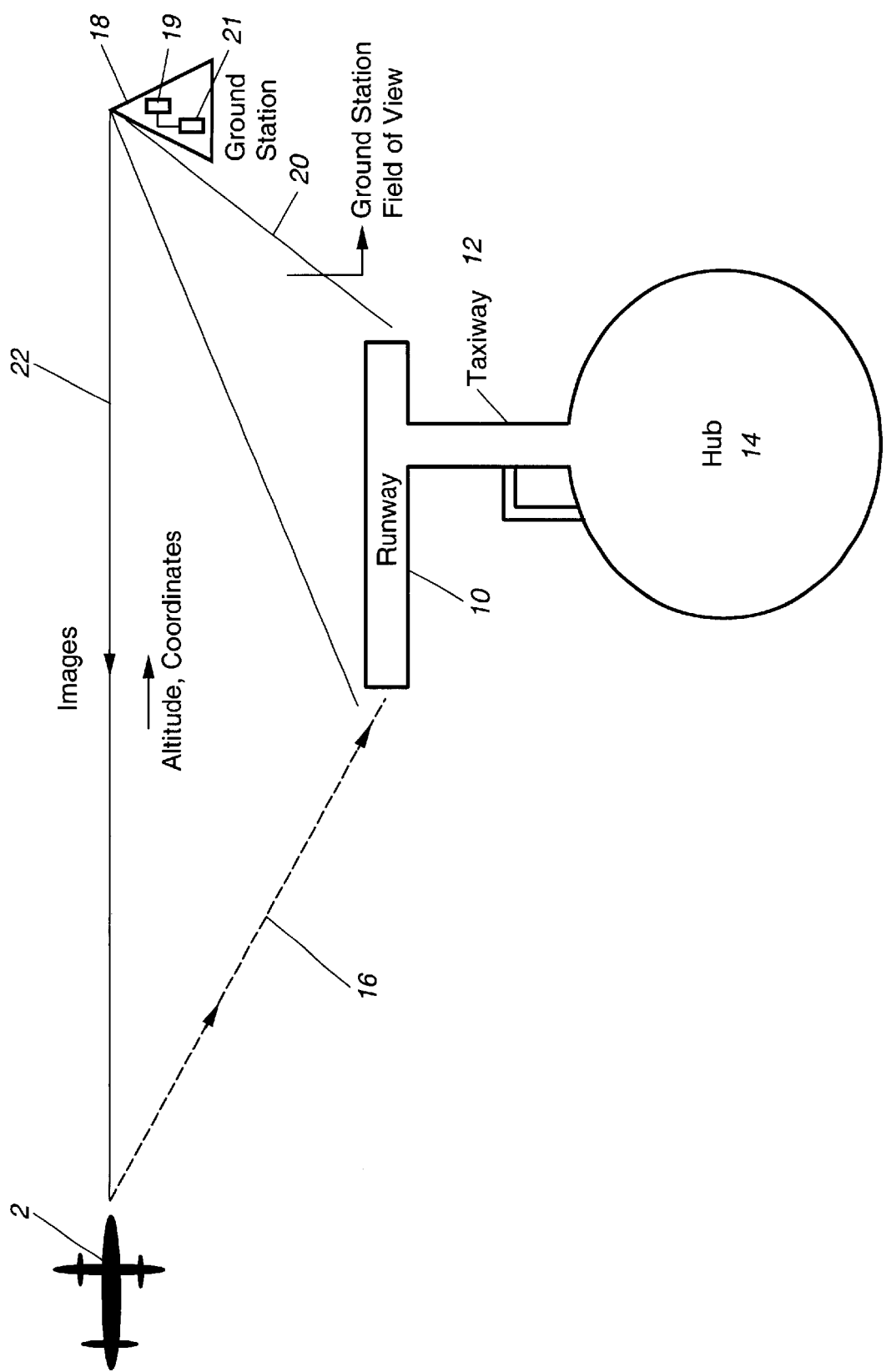
FIG. 2 is a diagram of an exemplary ground based millimeter wave imaging system according to the present invention.

FIG. 2 shows a diagram of an exemplary ground based millimeter wave imaging system according to the present invention. Ground station 18 is part of a ground based millimeter wave imaging system that also includes a transceiver 19 and image processor 21 located in ground station 18. Transceiver 19 transmits millimeter wave signals that obtain millimeter wave images of the airport that includes runway 10 and taxiway 12 of airport hub 14. The return signals are received by transceiver 19 in ground station 18 and are processed by image processor 21. Image processor 21 processes the millimeter wave images of the airport. Ground station 18 then transmits processed millimeter wave images to the aircraft that are in a format suitable for viewing by the pilot of the aircraft. The millimeter wave images aid the pilot in landing and taxiing in poor visibility conditions such as rain, fog, darkness, etc.

In a ground based millimeter wave imaging system according to the present invention, ground station 18 may contain one or a plurality of transceivers that send and receive millimeter wave signals to obtain millimeter wave images of the airport. Each transceiver transmits through its own field of view 20, although the field of views of transceivers may overlap. If multiple transceivers exist in a single ground station, the image processor receives the millimeter wave images from all transceivers and processes them. In a ground based millimeter wave imaging system according to the present invention, ground station 18 may also be equipped with multiple image processors that operate and communicate together to process the millimeter wave images from one or more transceivers.

In a ground based millimeter wave imaging system according to the present invention, ground station 18 has a data link 22 that provides a communication medium between ground station 18 and each aircraft. The data link 22 is used to transmit the processed millimeter wave images of the airport to each aircraft, such as aircraft 2, and the pilot. Data link 22 may also be used to receive information from the aircraft. The millimeter wave images sent to aircraft 2 over data link 22 may take into account the location of the aircraft. Therefore, aircraft 2 transmits location information to ground station 18 using data link 22. This location information includes the coordinates and attitude of aircraft 2. The aircraft location and attitude information is used by image processor 21 in ground station 18 to process millimeter wave images of the airport that are based on the location and attitude of the aircraft, i.e., the view of the airport as seen from the aircraft. Image processor 21 performs a location translation that translates the ground coordinates with the location and attitude of the aircraft. The millimeter wave images sent to the aircraft from the ground based millimeter wave imaging system are dynamic and real-time millimeter wave images of the airport. The millimeter wave images sent to the aircraft include real-time millimeter wave images of the layout of the airport, and anything else within the field of view 20, including any equipment, vehicles, or people. Further, real-time millimeter wave images of any movement or motion is also shown.

In a ground based millimeter wave imaging system according to the present invention, ground station 18 continuously obtains and processes millimeter wave images of the airport regardless of whether any aircraft is receiving the millimeter wave images or not. Therefore, unlike airborne millimeter wave imaging systems, the millimeter wave imaging system in ground station 18 has more dwell time to obtain and process millimeter wave images of the airport. This allows for the use of more sophisticated processing algorithms and techniques by the image processor, resulting in enhanced image quality, higher resolution, and improved contrast for the millimeter wave images transmitted to each aircraft for viewing by the pilots.

Although this exemplary embodiment of a ground based millimeter wave imaging system according to the present invention has been illustrated using FIG. 2 that includes only one aircraft 2, ground station 18 may transmit millimeter wave images to all aircraft entering the airport. A millimeter wave imaging system according to the present invention may include appropriate data links and image processors in ground station 18 to process millimeter wave images of the airport and receive location and attitude information from each aircraft. The millimeter wave imaging system would then send millimeter wave images of the airport to each aircraft that are based on the location and attitude of each individual aircraft.

The aircraft location and attitude information may also be obtained by the ground based millimeter wave imaging system. In this exemplary embodiment of the present invention, ground station 18 may include a ranging radar that would determine the location and attitude of all aircraft. This information is obtained by the ranging radar and used by image processor 21 to formulate the millimeter wave images. Therefore, the aircraft would receive the processed millimeter wave images, and would only need to send its attitude information to ground station 18.

In another exemplary embodiment of a ground based millimeter wave imaging system according to the present invention, the location and attitude translation of the ground coordinates with the location and attitude of the aircraft may be performed in the aircraft. In this embodiment, ground station 18 sends processed millimeter wave images to aircraft 2 that are not related to the location and attitude of the aircraft. Aircraft 2 contains processing capability to perform the location and attitude translation of the ground coordinates with the location and attitude of the aircraft thereby providing the pilot with millimeter wave images of the airport that are based on the position of the aircraft.

Data link 22 may consist of any communications protocol or method that allows for wireless transmissions. Preferably data link 22 is a high speed full duplex data transmission medium. Further, the ground based millimeter wave imaging system according to present invention may have multiple data links. This allows for higher reliability of the system since if the currently used data link should fail, another data link can be used as backup. This insures that all aircraft continue to receive high quality realtime millimeter wave images of the airport.

Figure 3:
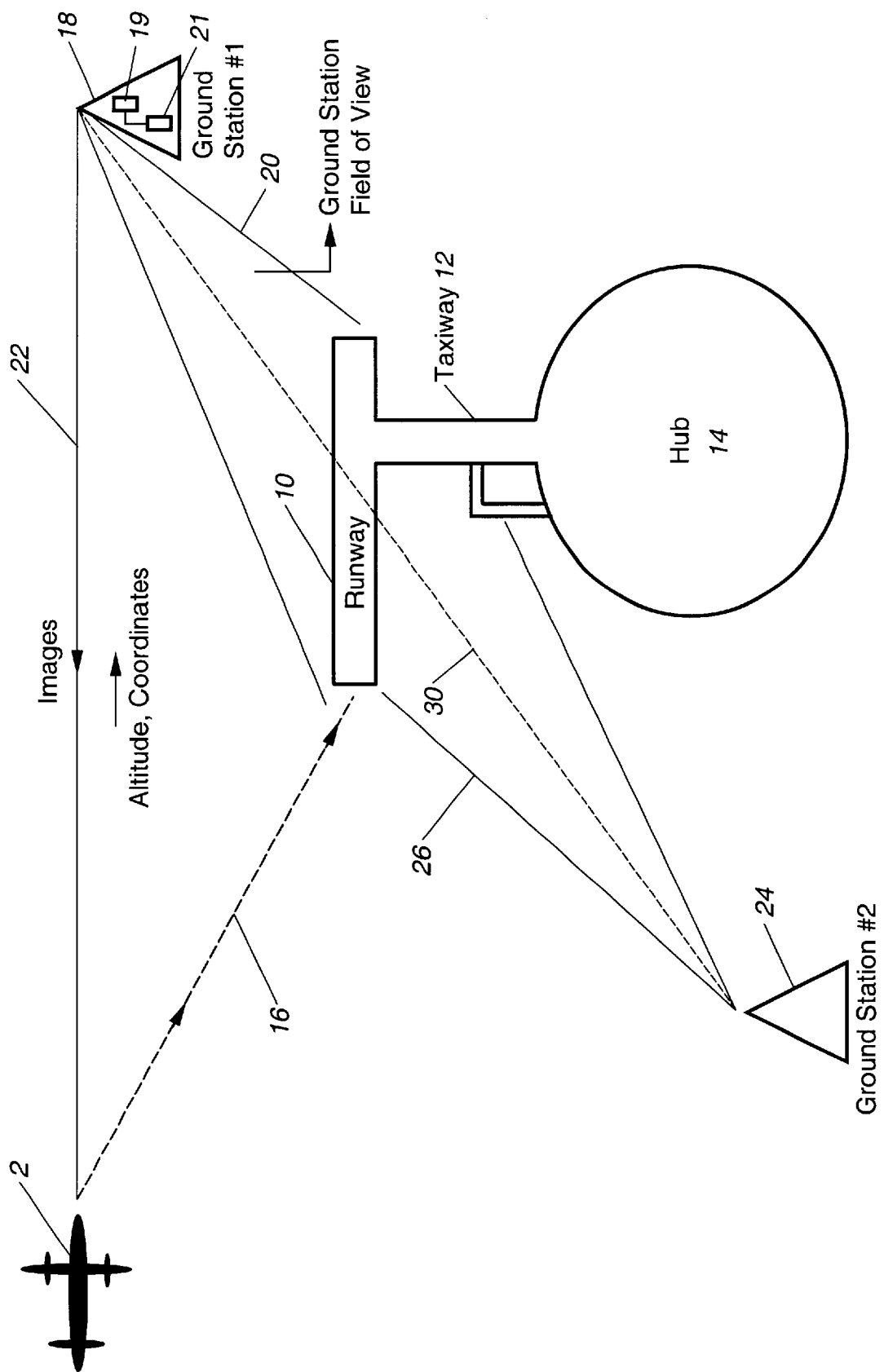
FIG. 3 is a diagram of an exemplary ground based millimeter wave imaging system with multiple ground stations according to the present invention.

FIG. 3 is a diagram of an exemplary ground based millimeter wave imaging system with multiple ground stations according to the present invention. As shown in FIG. 3, in this embodiment of the present invention, the ground based millimeter wave imaging system includes two or more ground stations. Ground stations 18 and 24 both contain one or more transceivers and image processors as mentioned previously. Multiple ground stations are useful if the airport is large and one ground station cannot obtain millimeter wave images of the entire airport. Each ground station contains transceivers that allow obtaining millimeter wave images of the airport within the transceivers field of view. The transceiver in ground station 18 has a field of view of 20, whereas the transceiver in ground station 24 has a field of view 26.

In this ground based millimeter wave imaging system embodiment, each ground station communicates with each other via a communication medium 30. The ground stations communicate information regarding the millimeter wave images each is processing. The data link from one ground station (ground station 18 in FIG. 3) provides the communication link to a particular aircraft. One ground station may provide the processed millimeter wave images to all aircraft, only the aircraft using that portion of the airport with the field of view of the ground station, or any combination of aircraft selected randomly or based on load balancing for the system.

A ground based millimeter wave imaging system according to the present invention has several advantages over contemporary airborne imaging systems. Since the system is ground based, the aircraft does not need to contain an imaging system, therefore, reducing the weight and volume taken up on the aircraft. Further, the cost of the aircraft is less since it does not include the cost of an imaging system. In addition, the dwell time of the system is continuous since the ground based millimeter wave imaging system is always monitoring the airport and capturing images long before an aircraft may need them. Therefore, more sophisticated processing algorithms, that require more time than available in airborne systems, may be used resulting in high contrast, high resolution millimeter wave images for the pilots.

Moreover, since the imaging system is ground based, should any part of the ground based millimeter wave imaging system need repair or retrofitting, the ground based millimeter wave imaging system is easily accessible at any time, in contrast to an airborne imaging system. Also, the reliability of a ground based millimeter wave imaging system is higher than an airborne millimeter wave imaging system since the ground stations have the capacity to house redundant millimeter wave transceivers, image processors, ranging radars, etc. that allow continuous operation of the millimeter wave imaging system when a particular element becomes faulty or inoperable. Moreover, there is no limit to the number of ground stations that may be added further increasing the reliability and fault tolerance of a ground based millimeter wave imaging system according to the present invention.

It is noted that the foregoing examples have been provided merely for the purpose of explanation and are in no way to be construed as limiting of the present invention. While the present invention has been described with reference to a preferred embodiment, it is understood that the words which have been used herein are words of description and illustration, rather than words of limitation. Changes may be made within the purview of the appended claims, as presently stated and as amended, without departing from the scope and spirit of the present invention in its aspects. Although the present invention has been described herein with reference to particular means, materials, and embodiments, the present invention is not intended to be limited to the particulars disclosed herein, rather, the present invention extends to all functionally equivalent structures, methods and uses, such as are within the scope of the appended claims.

What is claimed:

1. A ground based millimeter wave imaging system, which provides real-time millimeter wave images of an airport to at least one aircraft from at least one ground station, comprising:

a millimeter wave transceiver, the millimeter wave transceiver being located in said ground station, said millimeter wave transceiver collecting real-time millimeter wave images of the airport;

an image processor operatively connected to the at least one millimeter wave transceiver and located in said ground station, the image processor processing real-time millimeter wave images of the airport and acquiring location information and attitude information for each at least one aircraft; and a data link, the data link allowing communication of information between the aircraft and the ground station, the ground station transmitting the processed real-time millimeter wave images to the at least one aircraft using the data link.

2. The system according to claim 1, wherein the real-time millimeter wave images of the airport includes runways and taxiways at the airport.

3. The system according to claim 1, wherein the location information of the aircraft is obtained simultaneously with the collecting of real-time millimeter wave images of the airport.

4. The system according to claim 1, wherein the ground station obtains location information of the aircraft from the aircraft.

5. The system according to claim 1, wherein the ground station obtains location information of the aircraft using a ranging radar located in the ground station.

6. The system according to claim 1, the location information including coordinates and altitude of the at least one aircraft.

7. The system according to claim 1, wherein the data link comprises a high-speed full duplex data link.

8. The system according to claim 1, wherein the ground station converts the processed millimeter wave images of the airport to a format suitable for viewing by a pilot of the aircraft.

9. A method for providing real-time millimeter wave images of an airport to an aircraft to aid in landing and taxing of the aircraft, said method comprising:

collecting real-time millimeter wave images of the airport, the collecting executed by a ground station;

acquiring location and attitude information for the aircraft;

processing the millimeter wave images, the processing occurring in the ground station, the processed millimeter wave images being in a format for viewing by a pilot of the aircraft;

transmitting the processed millimeter wave images to the aircraft.

10. The method according to claim 9, comprising collecting real-time millimeter wave images of runways and taxiways of the airport.

11. The method according to claim 9, comprising acquiring location information that includes coordinates and altitude of the aircraft.

12. The method according to claim 9, comprising communicating information about the airport from each ground station to each other ground station.

13. The method according to claim 9, further comprising acquiring the location information for the aircraft simultaneously with the collecting of real-time millimeter wave images of the airport.

14. The method according to claim 9, further comprising acquiring the location and attitude information for the aircraft from the aircraft.

15. The method according to claim 9, further comprising acquiring the location information for the aircraft using a ranging radar located in the ground station.

16. The method according to claim 9, further comprising transmitting the processed millimeter wave images to the aircraft using a high speed full duplex data link.

* * * * *